(12) United States Patent
Mariotti

(10) Patent No.: US 6,412,401 B1
(45) Date of Patent: Jul. 2, 2002

(54) FILTERING DEEP FRYER FOR HOUSEHOLD USE

(76) Inventor: René Mariotti, 1254 Daleview Dr., McLean, VA (US) 22102

( * ) Notice: Subject to any disclaimer, the term of this patent is extended or adjusted under 35 U.S.C. 154(b) by 0 days.

(21) Appl. No.: 09/646,888

(22) PCT Filed: Apr. 26, 1999

(86) PCT No.: PCT/FR99/00978

§ 371 (c)(1),
(2), (4) Date: Oct. 6, 2000

(87) PCT Pub. No.: WO99/55211

PCT Pub. Date: Nov. 4, 1999

(30) Foreign Application Priority Data

Apr. 27, 1998 (FR) .............................. 98 05229

(51) Int. Cl.$^7$ ................................ A47J 37/12
(52) U.S. Cl. .............................. 99/407; 99/408; 99/410
(58) Field of Search .................. 99/407, 403, 408, 99/409, 410, 411, 412, 413, 414, 415, 416, 417, 418

(56) References Cited

U.S. PATENT DOCUMENTS

| 1,623,093 A | 4/1927 | Chapin |
| 2,568,792 A | * 9/1951 | Cripps ........................ 99/407 |
| 5,429,039 A | * 7/1995 | Chang ...................... 99/403 X |

FOREIGN PATENT DOCUMENTS

| FR | 1513132 | 2/1968 |
| FR | 2086562 | 12/1971 |
| FR | 2479677 | 10/1981 |

\* cited by examiner

*Primary Examiner*—Reginald L. Alexander
(74) *Attorney, Agent, or Firm*—Greenblum & Bernstein, P.L.C.

(57) ABSTRACT

Fryer for household use. The fryer includes a fry basket adapted to receive the food to be fried. A vessel is adapted to receive the fry basket. A bowl is adapted to receive the vessel and a quantity of oil. At least one of the fly basket and the vessel is adapted to move between a first position above the oil and a second position which is at least partially within the oil. A filter is adapted to be disposed inside the bowl. A biasing mechanism is adapted to be disposed within the bowl. A retaining mechanism is provided for retaining one of the fry basket and the filtering vessel in the second position.

44 Claims, 5 Drawing Sheets

FILTERING DEEP FRYER FOR HOUSEHOLD USE

BACKGROUND OF THE INVENTION

1. Field of the Invention

The present invention generally relates to a household fryer, of the type which includes a bowl which is adapted to receive an oil reserve up to a maximum filling level, a fry basket adapted to receive the food to be fried, a filtering vessel adapted to receive the fry basket and to slide inside the bowl along a downward course and between a high position for which the bottom of the vessel is higher than the maximum filling level of the bowl, and a low position for which at least the major portion of the basket, which is received in the vessel, is lower than the filling level. The filtering vessel can also move along an upward course. Additionally, the filtering vessel has a bottom wall in which at least a portion of the bottom wall forms a filter.

2. Description of Background and Relevant Information

A fryer of this type is disclosed, for example, in FR-A-2 479 677. In the patent, a removable waste filter 34 is inserted between a pan 32 and a basket 12, which basket can be displaced between its high position and its low position in the pan, and inversely, without any concurrent displacement of the waste filter. If the waste filter can be removed from the pan so as to eliminate of the waste retained therein, it is by implementing a specific manual step. In the absence of this implementation, the waste filter, along with the waste which it contains, remains immersed in the frying oil from one frying operation to the next. Moreover, when this operation is implemented, the waste filter is lifted directly from its immersed position in the oil toward the outside of the pan, inevitably with oil drippings on the cooking surface and risks of burning if the oil is hot. This unpractical system can urge the user not to extract the waste filter after each frying operation, in which case food debris build up in the waste filter, resulting in a further carbonization of these debris each time and an accelerated degradation of the oil.

Also contributing to this degradation is the fact that the free surface of the oil is almost entirely exposed to the ambient air.

Furthermore, a fryer has been proposed in FR-A-2 086 562, in which elastic means formed by a spring (9) takes support on the bottom of a first container, or pan (4), and on the bottom of a blind cylindrical boss (10) provided in the bottom of a second container, or fry basket (6), which spring biases the basket away from the bottom of the pan. The fryer also includes a means for temporary locking of the fry basket in low position.

This fryer is designed to maintain the basket in low position as long as the cooking of the food has not reached a certain stage. To this end, it is by means of an originally raw piece 18 of the food involved, fixed on skewers 19 attached to the cover, that the spring 9 is compressed when the cover is closed, which enables the basket to move and be maintained in a low position. When the piece of food inserted breaks or becomes too soft under the cooking effect, to keep the spring compressed, the latter expands and the basket rises. At this point, the food is supposed to be properly cooked.

This fryer comprises a bottom, or plate 22, on which the fry basket rests. If it is understood that this plate is lowered when the basket is lowered against the force of the spring, the patent is silent with respect to the means that enable the plate to rise with the basket: indeed, it is clearly indicated in the description of this patent that the spring does not push on the plate but on the basket (the plate necessarily having, to this end, a central cutout for the passage of the spring). Therefore, when the basket rises, there is no reason for the plate to follow along. In addition, the cylinder 11, that is affixed to the cover and into which penetrates the boss 10 of the bottom of the basket in high position thereof, prevents the opening of the fryer by pivoting of the lid about the hinge 14 when the fry basket is in this high position. This opening is possible only when the boss 11 is not engaged with the cylinder 10, i.e., in the low position of the basket, in other words, with the food immersed in the oil. The draining of the cooked food, subsequent to the automatic lifting of the basket, is done to no purpose.

SUMMARY OF THE INVENTION

The present invention overcomes the disadvantages of the prior art by proposing a fryer that is simple and safe. The flyer provides for filtering of oil and includes an elastic mechanism which supports the bottom of the filtering vessel instead of the fry basket.

Thus, the invention provides for filtering the oil each time the filtering vessel/fry basket assembly rises. Moreover, this is accomplished without any member being an obstacle to the opening of the flyer when the fry basket is in a high position, i.e., in a position which allows it to drain.

In operation, the elastic mechanism biases the filtering vessel upward and/or away from the bottom of the bowl. In at least one embodiment, this biasing mechanism can be constituted by a spring.

The invention therefore provides for a fryer for frying food comprising a fry basket adapted to receive the food to be fried, a vessel adapted to receive the fry basket, a bowl adapted to receive the vessel and a quantity of oil, at least one of the fly basket and the vessel being adapted to move between a first position above the oil and a second position which is at least partially within the oil, a filter adapted to be disposed inside the bowl, a biasing mechanism adapted to be disposed within the bowl, and a retaining mechanism for retaining one of the fry basket and the vessel in the second position.

The vessel may comprise a filtering vessel. The filter may be disposed between a bottom of the fry basket and a bottom of the filtering vessel. The filter may be disposed between the fry basket and a bottom inside surface of the bowl. The retaining mechanism may be adapted to temporarily lock the vessel in the second position. The biasing mechanism may engage a bottom of the vessel and a bottom of the bowl. The fryer may be adapted for household use and the bowl may be adapted to receive an oil reserve up to a maximum filling level. Each of the fry basket and the filtering vessel may be adapted to slide within the bowl. The biasing mechanism may bias one of, the filter, the fry basket, and the filtering vessel away from a bottom of the bowl. The first position may comprise a bottom of the vessel being disposed above a maximum filling level of the bowl and the second position may comprise the bottom of the vessel being disposed below the maximum filing level of the bowl. A bottom wall of the vessel may comprise the filter. The biasing mechanism may bias each of the filter, the vessel, and the fry basket away from a bottom of the bowl such that the filter, the vessel, and the fry basket are supported above the oil in the first position.

The biasing mechanism may comprise a spring. The vessel may comprise a bottom having at least one oil draining opening. The filter may comprise a fine-mesh netting arranged adjacent the oil draining opening. The filter may comprise a fine-mesh netting arranged adjacent at least one oil draining opening disposed in a bottom of the vessel. The at least one opening may be centrally disposed in the bottom of the vessel and wherein the fine-mesh netting comprises an area which is greater than an area of the at least one oil draining opening. A solid area of the bottom of the vessel may be at least 5–7 times greater than an area of the at least one oil draining opening. A fine-mesh area of the filter may be at least 5–7 times greater than an area of the at least one oil draining opening. The fryer may further comprise a cover. The cover may comprise the retaining mechanism. The cover may be adapted to be disposed within the bowl. The cover may be adapted to rest against the vessel and to slide within the bowl. The retaining mechanism may be adapted to lock the vessel in the second position after the cover is slid to a predetermined depth in the bowl.

The fryer may further comprise a removable oil cartridge. The removable cartridge may comprise a liner which is adapted to hold the quantity of oil. The removable cartridge may be adapted to receive the biasing mechanism and the quantity of oil. The fryer may further comprise a sealing mechanism adapted to be disposed between the vessel and the bowl. The sealing mechanism may comprise an o-ring. One of the vessel and the bowl may comprise a shoulder which is adapted to engage the sealing mechanism. The vessel may comprise a filtering vessel. The vessel may be adapted to be connected to an oil cartridge. The vessel may be connected to the oil cartridge via a threaded connection. The oil cartridge may comprise the biasing mechanism, a liner, and the quantity of oil.

The fryer may further comprise a pivoting lever connected to each of the fry basket and the bowl. The fryer may further comprise a cover.

The invention also provides for a fryer for flying food comprising a fry basket adapted to receive the food to be fried, a filtering vessel having at least one oil draining opening, the filtering basket being adapted to receive the fry basket, a bowl adapted to receive each of the fry basket, the filtering vessel and a quantity of oil, each of the fry basket and the vessel being adapted to move between a first position above the oil and a second position which is at least partially within the oil, a filter disposed inside the bowl, a biasing mechanism disposed within the bowl, a retaining mechanism for retaining one of the fry basket and the filtering vessel in the second position, a sealing mechanism disposed between the filtering vessel and the bowl, and a cover.

The invention further provides for a fryer for frying food comprising a fry basket adapted to receive the food to be fried, a filtering vessel having at least one oil draining opening, the filtering basket being adapted to receive the fry basket, a bowl adapted to receive each of the fry basket, the filtering vessel and a quantity of oil, each of the fry basket and the vessel being adapted to move between a first position above the oil and a second position which is at least partially within the oil, a biasing mechanism disposed within the bowl, a filter disposed between the fry basket and the biasing mechanism, a retaining mechanism for retaining one of the fry basket and the filtering vessel in the second position, a sealing mechanism disposed between the filtering vessel and the bowl, and a cover.

In a preferred embodiment, the bottom of the filtering vessel comprises a solid annular zone whose inner periphery edges a cutout provided, or in coincidence with a fine-mesh netting, the area of the solid annular zone being greater than that of the cutout, preferably 5–7 times greater.

To load the basket, the filtering vessel is in high position, under the effect of the thrust of the elastic mechanism that bias the filtering vessel upwardly. Once the basket has been loaded and the oil heated at the desired temperature, the user lowers the "filtering vessel/loaded basket" assembly by overcoming the force of the elastic mechanism until the time when the mechanism for temporarily locking the filtering vessel in low position is activated. Once cooking is completed, the locking mechanism is deactivated and, under the effect of the thrust of the elastic mechanism, the filtering vessel and the fry basket return to high position. After the fried food is drained, the basket can be extracted from the filtering vessel to unload the food.

During the rise of the filtering vessel, the oil present in the vessel is drawn into the space of increasing volume located beneath the vessel, which space constitutes the area for storing the oil reserve between two frying operations. The oil in which the basket was immersed reaches this storage area by passing through the portion forming the filter of the filtering vessel. It is therefore understood that the food debris that escaped from the basket do not pass into the oil storage area, but are retained in the area forming the filter of the filtering vessel, and that the filtering vessel, which has been drained, can easily be extracted from its high position so as to remove the waste therefrom.

Furthermore, between two frying operations, the solid zone of the bottom of the filtering vessel covers a major part of the surface of the oil reserve, the air space inserted between them being very thin if one is careful to complete the reserve periodically to maintain it substantially at a maximum level. This cover reduces the oil reserve oxidation.

In a preferred embodiment of the invention, the cutout of the filtering vessel is provided with a connecting mechanism adapted to engage with a matching connecting mechanism provided on an oil cartridge constituted of an enclosure that is capable of going from an expanded configuration to an accordion compressed configuration, and the elastic mechanism that bias the fry basket away from the bottom of the bowl is constituted by a spring included in the enclosure.

Advantageously, the matching connecting mechanism has are threadings, or equivalent mechanism (quarter turn), the cartridge being capable of being provided with a nozzle closed by a screwed cap.

Thus, to fill the fryer with oil, the user only needs to remove the screwed cap that blocks the nozzle of the cartridge, and to screw the nozzle on the edge of the cutout of the bottom of the filtering vessel. When the user wishes to replace the oil, he performs the same operations in reverse, with an obvious advantage as for the maintenance of the bowl and regard for the environment. The used oil is no longer disposed of in the sink; the used oil cartridge, which is closed by the cap of the newly installed cartridge, can be placed in an appropriate waste area.

In a first embodiment of the invention, the fryer comprises a cover with a horizontal section having the same geometry as, and a slightly smaller size than that of the bowl, and which is adapted to rest on the filtering vessel and to slide in the bowl, the temporary locking mechanism of the filtering vessel in low position acting by temporarily locking the cover at a predetermined sliding depth in the bowl.

It is understood that this cover thus has the double function of limiting/preventing the release of frying vapors in the atmosphere and of ensuring the locking of the filtering vessel, therefore of the fry basket, in low position.

In a preferred embodiment, the cover of the fryer comprises an outer wall having at least one vent, on the one hand, and a detachable inner wall, mostly bored and adapted to serve as a seat for a piece of filtering material housed within the cover, on the other hand. This piece of material, which can be made of absorbent cloth or absorbent paper, retains the oil micro-droplets driven by the water vapor that is released from the food during the frying, which micro-droplets are responsible for the frying smells.

Advantageously, to facilitate the drainage of the fry basket, fried food and filtering vessel, the fryer according to the invention comprises a draining mechanism, such as ultrasonic device which acts on the wall of the bowl, or a centrifugal device, and which are activated when the filtering vessel passes or has passed from low position to high position, after a frying operation.

In a particularly preferred embodiment of the fryer according to the invention, the ratio between the volume defined by the bowl up to the maximum oil filling level and the useful volume of the basket is at least equal to 5. By useful volume is meant the normal loading volume of the basket with food, for example, frozen fries.

Indeed, such a ratio is indispensable for a quasi-instantaneous grip of the food, which prevents an excessive penetration of oil into the food. In the commercially available household fryers, this ratio is, in the best case, equal to 1. As a result, when the basket, filly loaded with frozen fries, for example, is immersed in the oil that has been heated at the frying temperature, this temperature drops suddenly, which has the annoying consequence of causing the fries to absorb a greater quantity of oil than normal. The ratio recommended by the invention eliminates this disadvantage.

BRIEF DESCRIPTION OF THE DRAWINGS

Other advantageous characteristics and details of the invention will become apparent from the description that follows, with reference to the annexed drawings, in which.

DETAILED DESCRIPTION OF THE INVENTION

Figure 1:
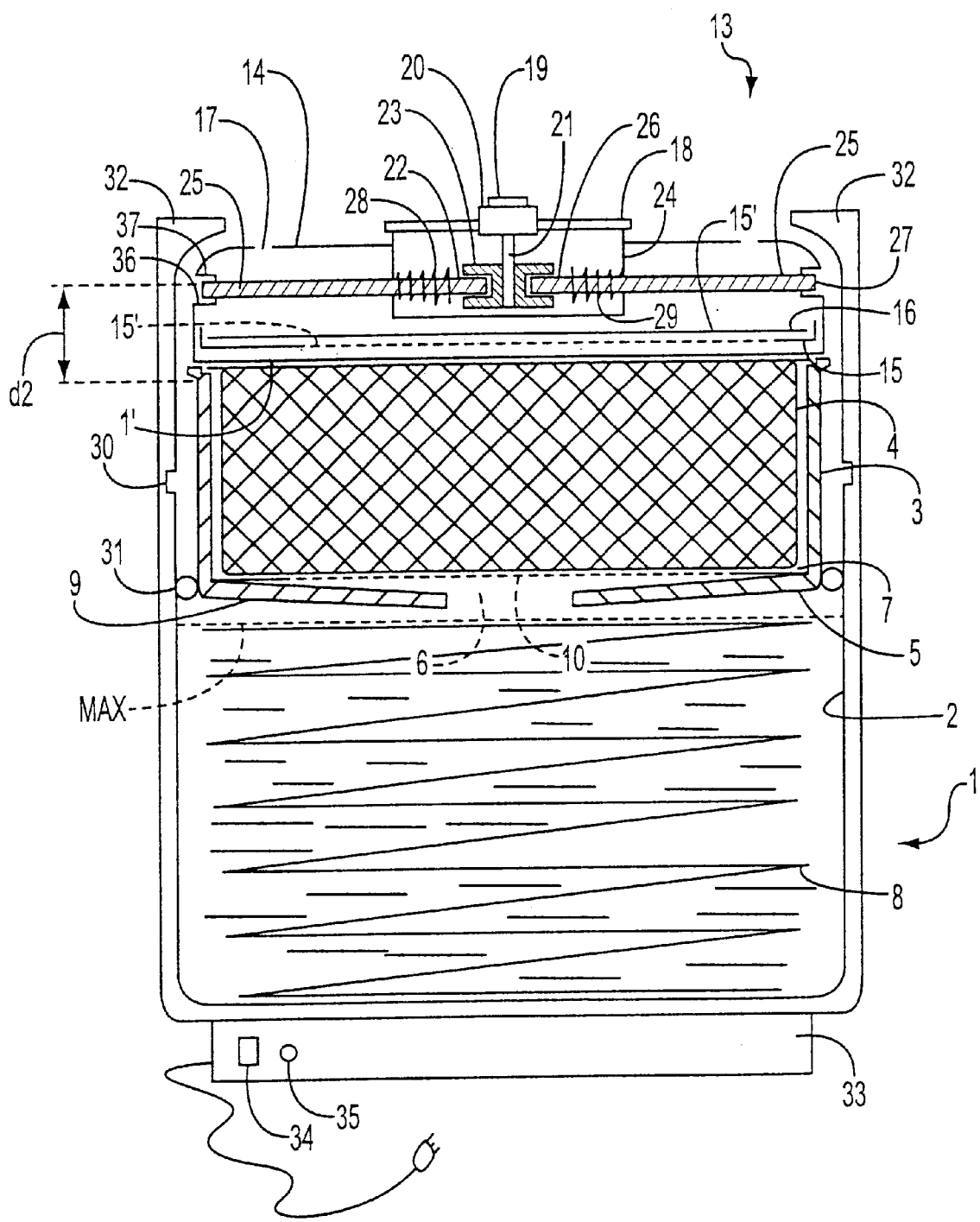
FIG. 1 shows a vertical schematic cross-section of a first embodiment of the fryer according to the invention in the resting position (i.e. with the frying bowl in high position)
Figure 2:
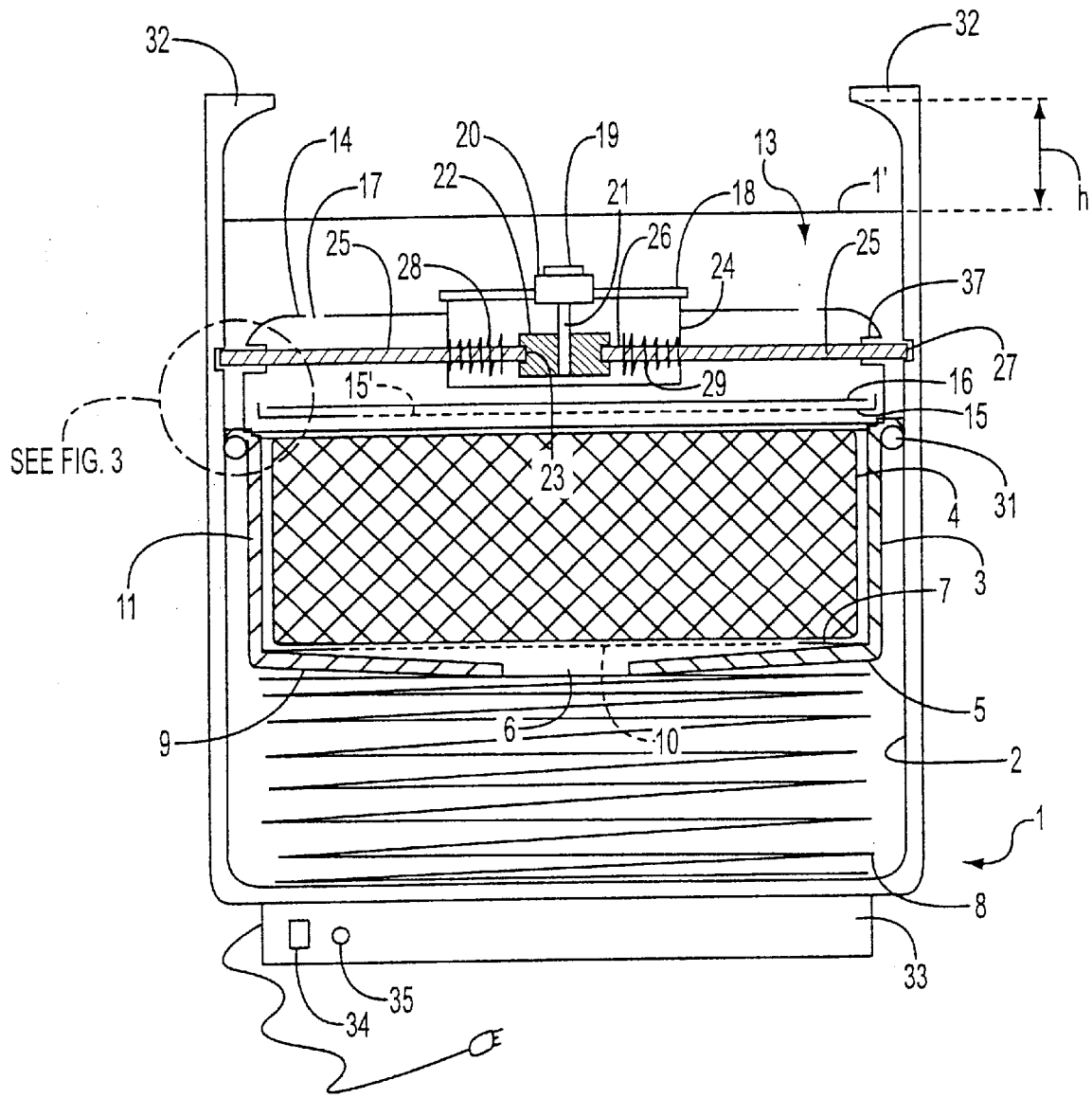
FIG. 2 shows the same embodiment as FIG. 1, but with the fryer in the frying position (i.e., with the frying bowl in low position)

Referring to FIGS. 1 and 2, one sees that the fryer according to the invention comprises a bowl 1 containing a filtering vessel 3, which itself contains a fry basket 4. In the following description, one will consider that said bowl 1, said vessel 3 and said basket 4 have a horizontal circular section, but this section can have another shape, for example, rectangular. The bowl 1 is included in a covering not shown.

The bottom 9 of the filtering vessel 3 rests on a spring 8 which takes support on the bottom of the bowl 1 and on bottom 9, and which biases the filtering vessel 3 upwardly.

The bottom 9 of the filtering vessel 3 includes an annular zone 5 demarcating a central cutout 6, and it supports a removable filtering disk, which is itself constituted of a fine-mesh metallic netting 10 surrounded with a solid edge 7. Alternatively, the netting could be made of a frying temperature resistant plastic material. By fine meshes is meant meshes whose opening is micrometric.

The upper end of the lateral wall of the vessel 3 has a flange 11 (FIG. 3) offering a shoulder 11' on which lugs 12, attached to the basket 4, rest.

A cover 13 constituted of an outer wall 14 and an inner wall 15 also rests on this flange 11. The inner wall 15, which can be easily detached by the user, is constituted of an annular plate in which a micrometric metallic netting 15' is crimped. The inner wall 15 of the cover 13 serves as a seat for a disk 16 made of absorbent material, such as a household absorbent paper, for example.

The outer wall 14 of the cover has vents 17, and it serves as a support for a timer mechanism 18 housed for the most part within the cover 13. This mechanism 18 comprises an index 19 that can be accessed from the outside of the cover 13 and is rotatably mounted against the force of a spiral spring included in a box, schematically represented by the reference numeral 20, containing conventional clock parts. From this box 20 emerges an axle 21 driven rotationally by the timer mechanism 18, and on which is blocked a piece 22 in the periphery of which a cam surface 23 is cut out. This cam surface roughly assumes the shape of a FIG. 8 laid horizontally, i.e., it comprises two substantially circular convex portions joined by two small concave zones forming a necking.

The axle 21 and the piece 22 are included in a housing 24 in the lower wall of which the axle 21 rotates. The lateral wall of the housing 24 has two diametrically opposed openings for the passage of two rods 25 which each comprise a proximal end 26 supported against the cam surface 23 and a distal end 27. FIG. 1 shows the rods 25 in support on the concave zones of the cam surface 23, whereas FIG. 2 shows them in support on the convex portions of surface 23. The distal end 27 of each of the rods 25 is received in a guiding sleeve 37 that communicates with an opening 36 made in the lateral wall of the cover 13.

On each rod 25, in the vicinity of its proximal end 26, an abutment 28 is provided, on which is supported one of the ends of a return spring 29, the other end of which takes support on the inner wall of the housing 24, the springs 29 maintaining the proximal end 26 of the rods 25 in contact with the cam surface 23.

Figure 3:
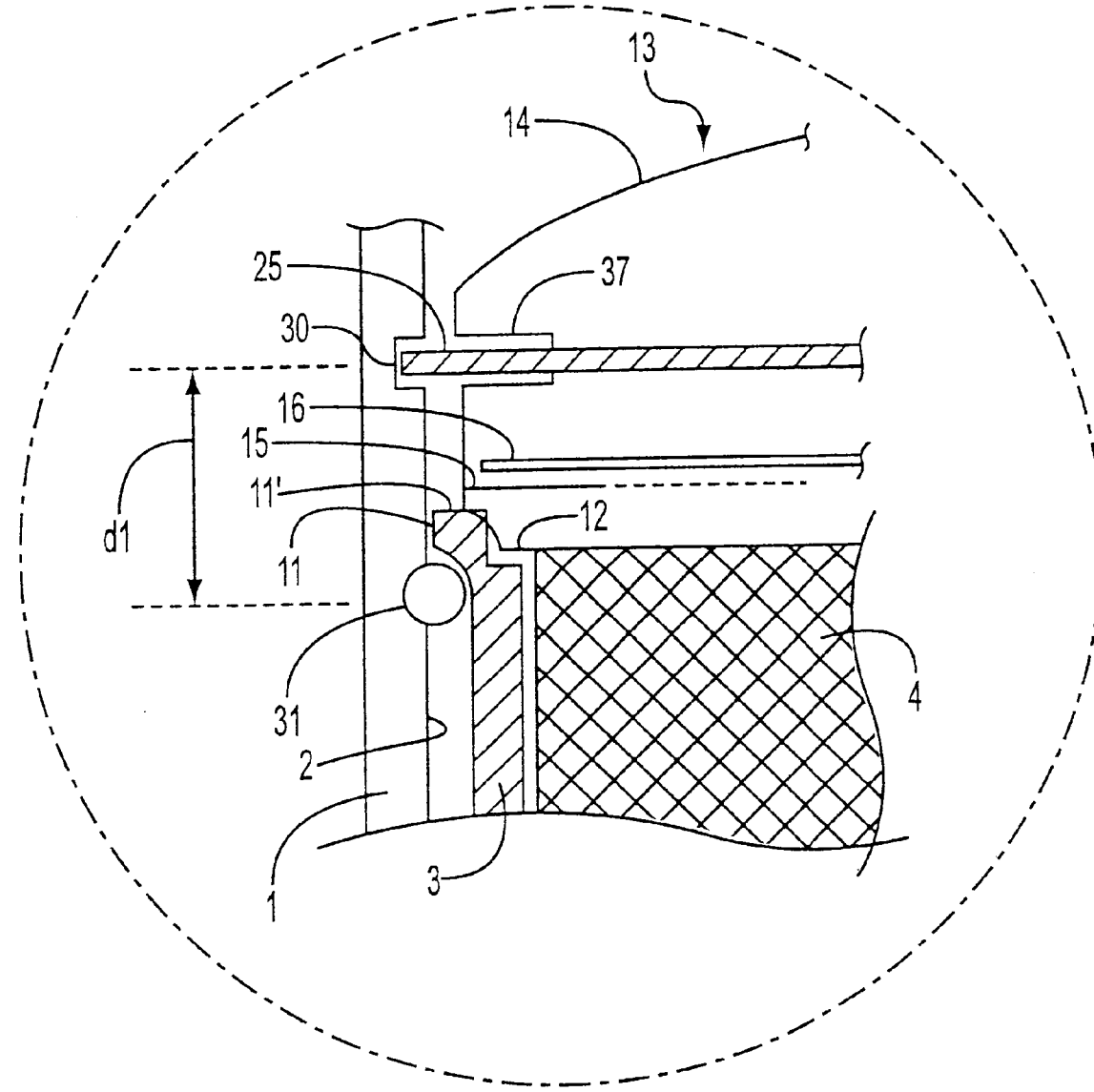
FIG. 3 shows on a larger scale the zone demarcated by a circle in FIG. 2.

The inner wall of the bowl 1 comprises a first peripheral groove 30 adapted to receive the distal end of the rods 25, and a second peripheral groove in which an o-ring 31 is housed, slightly below the groove 30. More specifically, the distance d1 (FIG. 3) between the plane of the groove 30 and that of the o-ring 31 is equal to the distance d2 (FIG. 1) between the plane of the rods 25 and that of the projection formed by the flange 11 (FIG. 3).

The free edge 1' of the bowl 1 has two roughly square-shaped, diametrically opposed returns 32 which affect only a small portion of the periphery of the bowl 1 and which project above the free edge 1'. The height h (FIG. 2) between the free edge 1' of the bowl and the inner surface of the returns 32, in a horizontal plane, is sufficient to enable the translational positioning of the cover 13 on the flange 11 of the filtering vessel 3.

The bowl 1 rests on a base 33 containing known a thermostat-controlled electric heating mechanism, which can be activated by a switch 34. An indicator light 35 signals that oil has reached the desired temperature.

The fry basket 4 and the filtering basket 3 includes a gripping mechanism, not shown, in order not to clutter the Figures.

The functioning of the fryer according to the invention and its operating mode will now be described.

Since the bowl 1 only contains the spring 8, the user fills the bowl 1 with oil up to the maximum level as referenced by Max. The user then introduces the filtering vessel 3 into the bowl 1, then the basket 4 loaded, for example, with frozen fries, in the vessel 3, and finally the cover 13 beneath the returns 32 by placing it on the flange 11 of the filtering vessel 3. The loaded fryer then has the configuration shown in FIG. 1. In particular, the springs 8 and 29 are expanded, the rods 25 are in the retracted position, and the fry basket 4 is not in contact with the oil reserve.

With the fryer is plugged into an electric source, the user turns on the switch 34 and waits for the indicator light 35 to be lit. A force is then exerted on the cover 13, against the spring 8, which results in progressively immersing the filtering vessel 3, and therefore the fry basket 4, into the hot oil. This force continues until the flanges 11 abut on the o-ring 31, which signals to the user that the distal ends 27 of the rods 25 are disposed adjacent the groove 30. The user then rotates the index 19 until reaching a reference mark corresponding to the start of cooking, which consequently sets the timer, on the one hand, and causes the piece 22 to rotate such that the cam surface portions offered to the proximal ends 26 of the rods 25 are the substantially circular convex portions. As a result, the rods 25 are projected or caused to move outwardly against the force of the return springs 29, and their distal ends 27 engage with the groove 30 by locking the cover 13 at this level of penetration into the bowl 1. The fryer then has the configuration shown in FIG. 2.

During the frying operation, the food releases water vapor charged with oil micro-droplets, which can escape only through the cover 13, this is because o-ring 31 ensures that the peripheral sealing of the cover 13 is maintained. More specifically, the frying vapors flow through the netting 15' of the cover 13, then the layer of absorbent materials 16 before escaping through the vents 17. The oil micro-droplets are retained upon passing by the absorbent material 16, such that, substantially, only the odorless water vapor is released into the atmosphere.

The count-down carried out by the timer continues and, as long as the rotating piece 22 offers a support to the proximal portions 26 of the rods 25 on the circular convex zones of the cam surface 23, the rods 25 are maintained in the projected position i.e., engaging groove 30. The time has elapsed when the piece 22 offers a support to the proximal ends 26 of the rods 25 on the neckings of the cam surface 23. Then under the effect of the return springs, the support is maintained, resulting in the backward movement of the rods 25 that disengage from the groove 30.

The filtering vessel 3, the fry basket 4 and the cover and 13 which it supports are pushed back upward under the effect of the spring 8. The volume demarcated by the bottom 9 of the filtering vessel 3 and the lower portion of the bowl 1 increases, resulting in a suction effect exerted, through the cutout 6, on the oil that is located above the bottom 9. This oil can reach the lower portion of the bowl 1 (i.e., the portion of the bowl located beneath the vessel 3, in high position of the latter) only by passing through the netting 10 such that clears it of any debris which it contains. Therefore, the oil that reaches beyond the cutout 6 is filtered oil.

The filtering of the oil through the netting 10 slows the rise of the various elements 3, 4, 13, such that they do not risk "jumping" out of the bowl 1. In any event, the provision of the returns 32 prevents such incident from occurring.

When the frying operation is completed, the fryer has returned to the configuration of FIG. 1. A vibrating mechanism can be, provided in the covering, not shown, of the bowl 1, which can then be activated to perfect the draining of the fried food. This treatment also makes it possible to accelerate the return, toward the lower portion of the bowl 1, of the residual oil that is present on the walls of the upper portion of the bowl 1, on the filtering vessel 3, and on the fry basket 4.

If one respects a ratio, with a minimum equal to 5, between the volume of oil and the useful volume of the basket, for example, if a minimum volume of 1,250 ml of oil is used for a part of 250 g of frozen fries, the cooking time will be 1 to 2 minutes. Furthermore, the capacity of the basket 4 is preferably limited such that it is not possible to place more than 250 g of fries therein.

To unload the basket 4, the user slides the cover 13 translationally to release it from the returns 32, then he extracts the fry basket 4 from the bowl 1.

Next, he then extracts the filtering vessel 3 which, at this point, is completely drained, and thereafter he removes the debris retained on the netting 10 by turning the vessel 3 over and shaking the disk 10. The fry basket 4, the filtering vessel 3 and the disk, 10 can be washed in the dishwasher. The same is true for the inner wall 15 of the cover 13 that can be detached for cleaning, and for replacing the absorbent material 16.

Between two periods of usage, the free surface of the oil reserve is not very exposed to the air due to the presence of the annular zone 5 of the bottom 9 of the filtering vessel 3, which contributes to a good preservation thereof.

In the second embodiment shown in FIGS. 4–6, the elements that are identical or very similar to those described with reference to FIGS. 1–3 are designated by the same reference numerals followed by a prime sign.

Instead of a cover sliding in the bowl 1, the second embodiment comprises a cover 100 pivotally mounted to the side covering 102 of the bowl 1' by a hinge 101. This cover 100, observed hereinabove, has the shape of a frame adapted to receive a disposable filter 16' that can be temporarily affixed to cover 100.

Rather than being lowered under the effect of a vertical force exerted on the sliding cover as in the previous embodiment, the fry basket 4' and the filtering vessel 3' are lowered under the effect of the movement of a lever 103 pivotally mounted at 104 on a portion 105 attached to the side covering 102 of the bowl 1'. More specifically, this lever 103 has the shape of a fork formed, on the side of the pivot 104, of two arms 106, only one of which is visible in FIGS. 4 and 5, and of a tail 107 on the other side of the pivot 104. The end of the arms 106 that is distanced from the pivot 104 is articulated at 108 on a connecting rod 109, which is itself articulated at 110 on the fry basket 4'. Therefore, the arms 106 are affixed to the basket 4' in two opposite zones on both sides of the basket 4'. The tail 107, which can be constituted of extensions attached to the arms 106, has its end distanced from the pivot 104 across from a finger 111 that is movable in a vertical plane and in support on an eccentric wheel 112 forming a cam, mounted on an axis 113 on which is wedged a pinion 114 driven rotationally by a pinion 115, itself wedged on an axis 116. The axis 116 is driven rotationally by a mechanism forming the timer included in the button 117.

The axis 104 rests on a support (not shown) from which it can be easily separated, thus enabling the basket 4' to be extracted from the bowl 1'.

Figure 6:
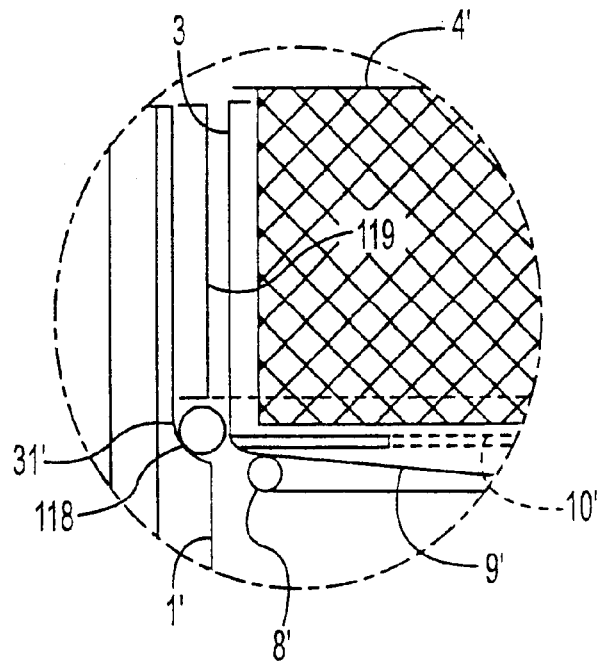
FIG. 6 is a detail on a larger scale of the zone demarcated by a circle in FIG. 4.

As better seen in FIG. 6, the bowl 1', which can be made of a buckled plate, has a larger section in the zone surrounding the fry basket 4' in high position than in the zone located beneath this basket. The variation in the section creates a peripheral shoulder 118 that receives the o-ring 31'. A removable liner 119 rests on this o-ring 31'. Means, not shown, are provided for easily extracting the liner 119 from the bowl 1'.

The functioning of the fryer, in its second embodiment, is as follows:

The cover 100 can be opened, i.e., tilted towards the left (now shown) and about a hinge 101. Then, with the spring 8' disposed inside the bowl 1', the user fills the bowl 1' with oil up to the maximum level. The user then introduces the filtering vessel 3' into the bowl 1', then the basket 4', then the axis 104 is replaced on its support. Next, the user loads the basket 4', for example, with frozen fries, then folds the cover 100 back toward the right around the hinge 101. The assembly is then presented as shown in FIG. 4 (neither the fries nor the oil are shown in order not to clutter the drawing).

In particular, the spring 8' is expanded, and the fry basket 4' is not in contact with the oil reserve.

With the fryer plugged into an electric source, the user turns on the switch 34' and waits for the indicator light 35' to come on. He then rotates the button 117 over an angle referenced by a mark corresponding to standard cooking, or over a slightly smaller or larger angle depending upon whether he prefers faster or slower cooking. This rotation of the button 117 causes the rotation of the axis 116, pinions 115 and 114, axis 113, and cam 112 that comes to lift the finger 111, which in turn lifts the tail 107 of the lever 103. The latter pivots about the axis 104 and causes a pushing of the basket 4', and subsequently the filtering vessel 3', downwardly against the force of the spring 8' that becomes compressed, which leads to progressively immersing the basket 4' in hot oil. The fryer then has the configuration shown in FIG. 5.

The timer mechanism included in the button 117 counts down the selected cooking time, the gear ratio between the pinions 115 and 114 and the geometry of the cam 112 being such that the finger 111 remains lifted (and therefore, the basket 4' remains in low position) as long as this time has not elapsed. Once the time has elapsed, the cam 112 enables the finger 111 to be lowered, releasing the tail 107 of the lever 103. Under the effect of the spring 8', the filtering vessel 3' and the basket 4' which it supports are pushed back upwardly. As in the case of the first embodiment, the oil that is located above the bottom 9' of the vessel 3' is drawn downwardly, and it can reach the lower portion of the bowl 1' only by passing through the netting 10' which clears it of any possible debris which it contains.

The water vapor charged with oil micro-droplets that is released during the frying operation can escape only by flowing through the filter 16' of the cover 100, the o-ring 31' ensuring the peripheral sealing between the vessel 3' and the bowl 1'.

Figure 4:
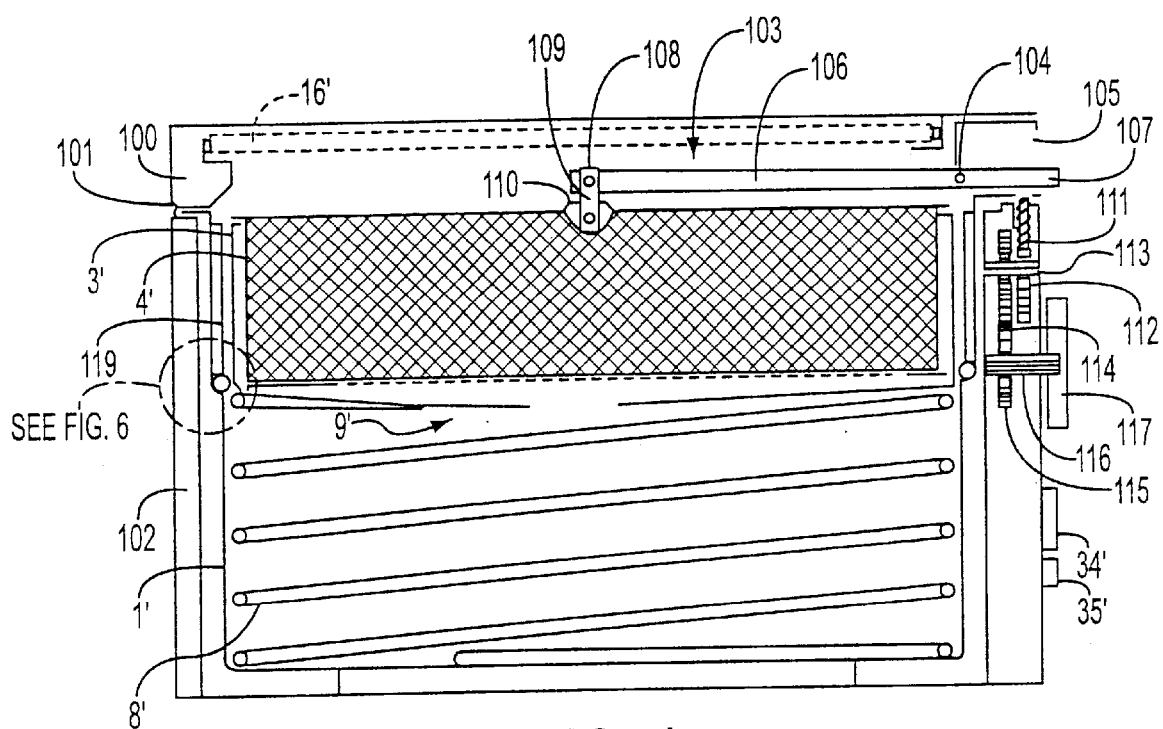
FIG. 4 shows a vertical schematic cross-section of a second embodiment of the invention, with the fry basket in high position.

When the frying operation is completed, the fryer has returned to the configuration of FIG. 4.

To unload the fryer, the user tilts the cover 100 about the hinge 101, then he extracts the drained fry basket 4' from the bowl 1' after separating the axis 104 from its support.

He can then extract from the bowl the liner 119 which thus protects the top portion of bowl 1' from one frying operation to the next, on the one hand, and the filtering vessel 3', on the other hand. He removes the debris retained on the netting 10' as before. The fry basket 4', the liner 119, the filtering vessel 3 and the netting disk 10' can be washed in the dishwasher. The absorbent material 16' lining the cover 100 can be replaced.

Figure 5:
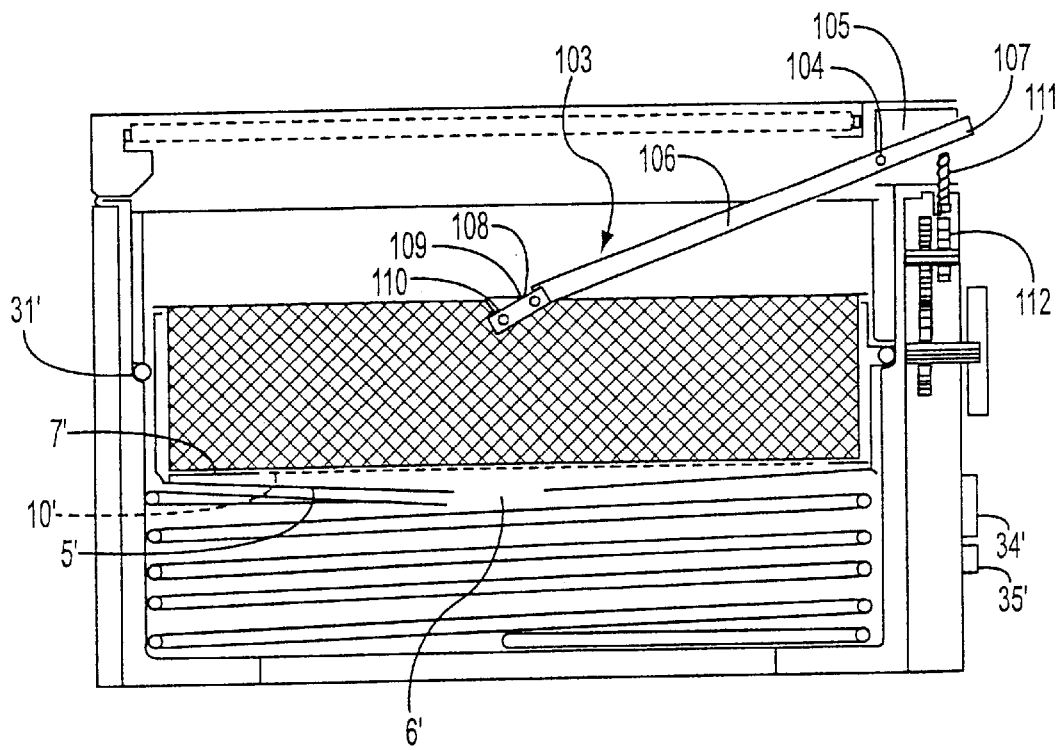
FIG. 5 is a view similar to FIG. 4, but with the fry basket in low position.
Figure 7:
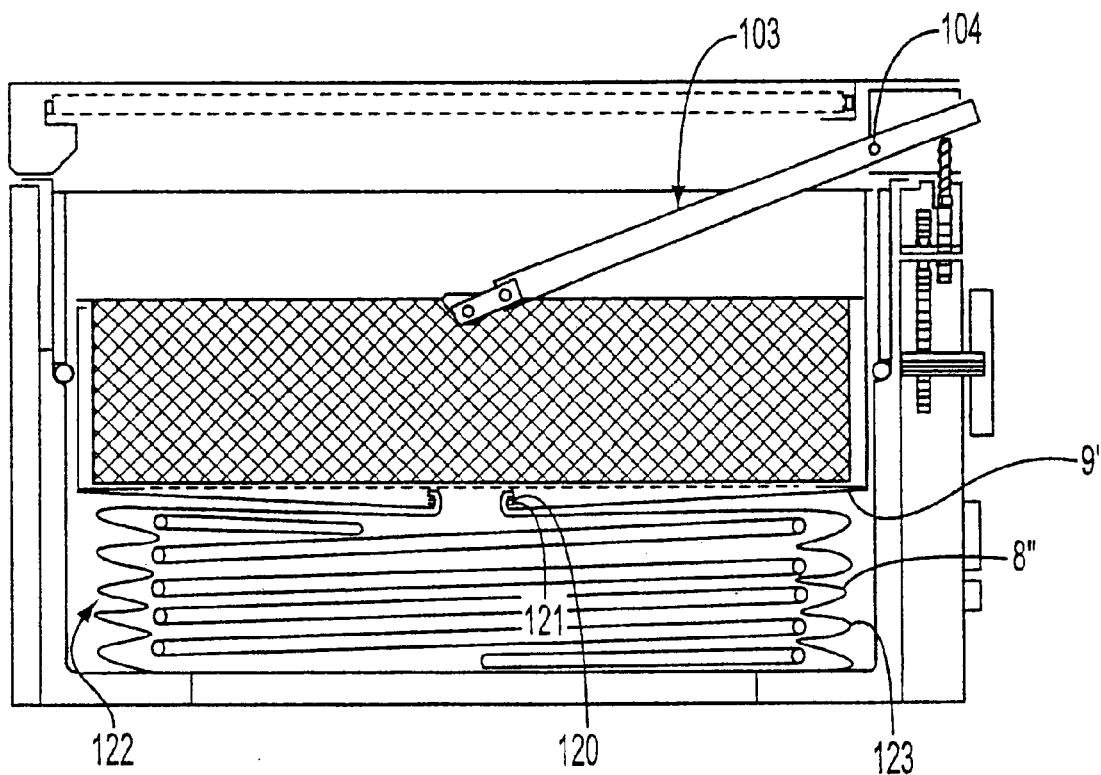
FIG. 7 is a detailed view of a variation of FIG. 5 showing the use of an oil cartridge.

As to FIG. 7, it distinguishes over FIG. 5 only in that it shows the use of an oil spring cartridge. More specifically, the edge of the central cutout of the bottom 9' of the vessel 3' has been provided with a threaded connection piece 120 matched to the threaded nozzle 121 of an enclosure 122 containing a spring 8", and the wall 123 of which is adapted to fold in accordion.

Before use, the threaded nozzle 121 is closed by a screwed cap. Since the basket 4' and the vessel 3' have been extracted from the bowl 1', the user opens the oil cartridge and screws its nozzle 121 on the connection piece 120 of the vessel 3'. He then replaces, in the bowl 1', the vessel 3' thus equipped and the basket 4' loaded with food to be cooked, as before.

This embodiment functions exactly as the previous one, with the exception that instead of being contained directly in the bowl 1', the oil is contained in the enclosure 122, which is itself housed in the bowl 1'.

When the basket 4' and the filtering vessel 3' are lowered, they compress the spring 8" contained in the enclosure 122 of the cartridge whose wall 123 folds in accordion. The oil is expelled from the cartridge via its nozzle 121 and the connecting piece 120 of the filtering vessel 3'. The o-ring 31' prevents the boiling oil from passing from the top of the vessel 3' between the bowl 1' and the outer wall 123 of the cartridge.

When the lever 103 is released and can pivot about the axis 104, the spring 8" expands, the wall 123 of the cartridge unfolds and the oil that was outside of the cartridge is re-drawn by the connecting piece 120 of the vessel 3' and the nozzle 121 of the cartridge.

When the user wishes to replace the oil after a certain number of frying operations, he extracts the basket 4' and the vessel 3' from the bowl 1', unscrews the nozzle 121 from the connecting piece 120, blocks this nozzle with the cap that he had kept or with the cap of a newly installed cartridge, and disposes of the used oil cartridge.

Of course, it is understood that the invention is not limited to the embodiments described and shown.

In particular, the temporary locking mechanism could have another configuration than those described, and could be controlled by mechanisms other than a timer/cam surface assembly. Rather than using concurrently a filtering vessel 3 whose cutout 6 is completely open and a removable filtering disk such as 10 resting on the bottom of the vessel, one could use a vessel 3 whose cutout 6 would be directly provided with a fine-mesh netting. Instead of a spring 8, a metallic bellows could be used. It is possible that the fryer not be equipped with electric heating mechanism, in which case the base 33 would be replaced by a heating sole adapted to be placed on a heat source. These alternative embodiments are in no way limiting.

What is claimed is:

1. A fryer for frying food comprising:
    a fry basket adapted to receive the food to be fried;
    a vessel adapted to receive the fry basket;
    a bowl adapted to receive the vessel and a quantity of oil;
    at least one of the fry basket and the vessel being adapted to move between a first position above the oil and a second position which is at least partially within the oil;

at least one filter adapted to be disposed inside the bowl;

a biasing mechanism adapted to be disposed within the bowl;

a retaining mechanism for retaining one of the fry basket and the vessel in the second position; and a sealing mechanism at least one of:
  disposed in an area between a side of the bowl and a side of the fry basket;
  arranged between the bowl and the vessel;
  mounted to an inside surface of the bowl;
  engaging each of the bowl and the vessel;
  providing sealing between the bowl and the vessel; and
  preventing oil in the bowl from moving upwards and past the sealing mechanism into a space between the vessel and the bowl.

2. The fryer of claim 1, wherein the vessel comprises a filtering vessel.

3. The fryer of claim 2, wherein the filter is disposed between a bottom of the fry basket and a bottom of the filtering vessel.

4. The fryer of claim 1, wherein the retaining mechanism is adapted to temporarily lock the vessel in the second position.

5. The fryer of claim 1, wherein the biasing mechanism engages a bottom of the vessel and a bottom of the bowl.

6. The fryer of claim 1, wherein the fryer is adapted for household use and wherein the bowl is adapted to receive an oil reserve up to a maximum filling level.

7. The fryer of claim 1, wherein each of the fry basket and the filtering vessel is adapted to slide within the bowl.

8. The fryer of claim 1, wherein the biasing mechanism biases one of, the at least one filter, the fry basket, and the filtering vessel away from a bottom of the bowl.

9. The fryer of claim 8, wherein the first position comprises a bottom of the vessel being disposed above a maximum filling level of the bowl and the second position comprises the bottom of the vessel being disposed below the maximum filing level of the bowl.

10. The fryer of claim 1, wherein a bottom wall of the vessel comprises the at least one filter.

11. The fryer of claim 1, wherein the biasing mechanism biases each of the at least one filter, the vessel, and the fry basket away from a bottom of the bowl such that the at least one filter, the vessel, and the fry basket are supported above the oil in the first position.

12. The flyer of claim 1, wherein the biasing mechanism comprises a spring.

13. The fryer of claim 1, wherein the vessel comprises a bottom having at least one oil draining opening.

14. The fryer of claim 1, further comprising a cover.

15. The fryer of claim 1, wherein the vessel comprises a filtering vessel.

16. The fryer of claim 1, further comprising a liner disposed within the bowl.

17. The fryer of claim 1, further comprising a liner disposed between the bowl and the filtering vessel.

18. The fryer of claim 1, further comprising a liner disposed between the bowl and the fry basket.

19. The fryer of claim 1, further comprising a removable liner disposed inside the bowl.

20. The fryer of claim 1, further comprising a removable liner disposed between the bowl and the filtering vessel.

21. The fryer of claim 1, further comprising a removable liner disposed between the bowl and the fry basket.

22. A fryer for frying food comprising:

a fry basket adapted to receive the food to be fried;

a filtering vessel having at least one oil draining opening, the filtering basket being adapted to receive the fry basket;

a bowl adapted to receive each of the fry basket, the filtering vessel and a quantity of oil;

each of the fry basket and the vessel being adapted to move between a first position above the oil and a second position which is at least partially within the oil;

a filter disposed inside the bowl;

a biasing mechanism disposed within the bowl;

a retaining mechanism for retaining one of the fry basket and the filtering vessel in the second position;

a sealing mechanism disposed between the filtering vessel and the bowl; and a cover.

23. A fryer for frying food comprising:

a fry basket adapted to receive the food to be fried;

a filtering vessel having at least one oil draining opening, the filtering basket being adapted to receive the fry basket;

a bowl adapted to receive each of the fry basket, the filtering vessel and a quantity of oil;

each of the fry basket and the vessel being adapted to move between a first position above the oil and a second position which is at least partially within the oil;

a biasing mechanism disposed within the bowl;

a filter disposed between the fry basket and the biasing mechanism;

a retaining mechanism for retaining one of the fry basket and the filtering vessel in the second position;

a sealing mechanism disposed between the filtering vessel and the bowl; and a cover.

24. A fryer for frying food comprising:

a fry basket adapted to receive the food to be fried;

a vessel adapted to receive the fry basket;

a bowl adapted to receive the vessel and a quantity of oil;

at least one of the fry basket and the vessel being adapted to move between a first position above the oil and a second position which is at least partially within the oil;

at least one filter adapted to be disposed inside the bowl;

a biasing mechanism adapted to be disposed within the bowl; and a retaining mechanism for retaining one of the fly basket and the vessel in the second position, wherein the filter is disposed between the fry basket and a bottom inside surface of the bowl.

25. A fryer for frying food comprising:

a fry basket adapted to receive the food to be fried;

a vessel adapted to receive the fry basket;

bowl adapted to receive the vessel and a quantity of oil;

at least one of the fry basket and the vessel being adapted to move between a first position above the oil and a second position which is at least partially within the oil;

at least one filter adapted to be disposed inside the bowl;

a biasing mechanism adapted to be disposed within the bowl; and a retaining mechanism for retaining one of the fry basket and the vessel in the second position, wherein the vessel comprises a bottom having at least one oil draining opening, and wherein the filter comprises a fine-mesh netting arranged adjacent the oil draining opening.

26. A fryer for frying food comprising:
a fry basket adapted to receive the food to be fried;
a vessel adapted to receive the fry basket;
a bowl adapted to receive the vessel and a quantity of oil;
at least one of the fry basket and the vessel being adapted to move between a first position above the oil and a second position which is at least partially within the oil;
at least one filter adapted to be disposed inside the bowl;
a biasing mechanism adapted to be disposed within the bowl; and
a retaining mechanism for retaining one of the fry basket and the vessel in the second position,
wherein the filter comprises a fine-mesh netting arranged adjacent at least one oil draining opening disposed in a bottom of the vessel.

27. The fryer of claim 26, wherein the at least one opening is centrally disposed in the bottom of the vessel and wherein the fine-mesh netting comprises an area which is greater than an area of the at least one oil draining opening.

28. The fryer of claim 27, wherein a solid area of the bottom of the vessel is at least 5–7 times greater than an area of the at least one oil draining opening.

29. The fryer of claim 27, wherein a fine-mesh area of the filter is at least 5–7 times greater than an area of the at least one oil draining opening.

30. A fryer for frying food comprising:
a fry basket adapted to receive the food to be fried;
a vessel adapted to receive the fry basket;
a bowl adapted to receive the vessel and a quantity of oil;
at least one of the fry basket and the vessel being adapted to move between a first position above the oil and a second position which is at least partially within the oil;
at least one filter adapted to be disposed inside the bowl;
a biasing mechanism adapted to be disposed within the bowl;
a retaining mechanism for retaining one of the fry basket and the vessel in the second position; and
a cover,
wherein the cover comprises the retaining mechanism.

31. A fryer for frying food comprising:
a fry basket adapted to receive the food to be fried;
a vessel adapted to receive the fry basket;
a bowl adapted to receive the vessel and a quantity of oil;
at least one of the fry basket and the vessel being adapted to move between a first position above the oil and a second position which is at least partially within the oil;
at least one filter adapted to be disposed inside the bowl;
a biasing mechanism adapted to be disposed within the bowl;
a retaining mechanism for retaining one of the fry basket and the vessel in the second position; and
a cover,
wherein the cover is adapted to be disposed within the bowl.

32. The fryer of claim 31, wherein the cover is adapted to rest against the vessel and to slide within the bowl.

33. The fryer of claim 32, wherein the retaining mechanism is adapted to lock the vessel in the second position after the cover is slid to a predetermined depth in the bowl.

34. A fryer for frying food comprising:
a fry basket adapted to receive the food to be fried;
a vessel adapted to receive the fly basket;
a bowl adapted to receive the vessel and a quantity of oil;
at least one of the fry basket and the vessel being adapted to move between a first position above the oil and a second position which is at least partially within the oil;
at least one filter adapted to be disposed inside the bowl;
a biasing mechanism adapted to be disposed within the bowl;
a retaining mechanism for retaining one of the fry basket and the vessel in the second position; and
a removable oil cartridge.

35. The fryer of claim 34, wherein the removable cartridge comprises a liner which is adapted to hold the quantity of oil.

36. The fryer of claim 34, wherein the removable cartridge is adapted to receive the biasing mechanism and the quantity of oil.

37. A fryer for frying food comprising:
a fry basket adapted to receive the food to be fried;
a vessel adapted to receive the fly basket;
a bowl adapted to receive the vessel and a quantity of oil;
at least one of the fry basket and the vessel being adapted to move between a first position above the oil and a second position which is at least partially within the oil;
at least one filter adapted to be disposed inside the bowl;
a biasing mechanism adapted to be disposed within the bowl;
a retaining mechanism for retaining one of the fry basket and the vessel in the second position; and
a sealing mechanism adapted to be disposed between the vessel and the bowl.

38. The fryer of claim 37, wherein the sealing mechanism comprises an o-ring.

39. The fryer of claim 37, wherein one of the vessel and the bowl comprises a shoulder which is adapted to engage the sealing mechanism.

40. A fryer for frying food comprising:
a fry basket adapted to receive the food to be fried;
a vessel adapted to receive the fry basket;
a bowl adapted to receive the vessel and a quantity of oil;
at least one of the fry basket and the vessel being adapted to move between a first position above the oil and a second position which is at least partially within the oil;
at least one filter adapted to be disposed inside the bowl;
a biasing mechanism adapted to be disposed within the bowl; and
a retaining mechanism for retaining one of the fry basket and the vessel in the second position,
wherein the vessel is adapted to be connected to an oil cartridge.

41. The fryer of claim 40, wherein the vessel is connected to the oil cartridge via a threaded connection.

42. The fryer of claim 40, wherein the oil cartridge comprises the biasing mechanism, a liner, and the quantity of oil.

43. A fryer for frying food comprising:
a fry basket adapted to receive the food to be fried;
a vessel adapted to receive the fry basket;

a bowl adapted to receive the vessel and a quantity of oil;

at least one of the fry basket and the vessel being adapted to move between a first position above the oil and a second position which is at least partially within the oil;

at least one filter adapted to be disposed inside the bowl;

a biasing mechanism adapted to be disposed within the bowl;

a retaining mechanism for retaining one of the fry basket and the vessel in the second position; and a pivoting lever connected to each of the fry basket and the bowl.

44. The fry of claim 43, further comprising a cover.

\* \* \* \* \*

UNITED STATES PATENT AND TRADEMARK OFFICE
CERTIFICATE OF CORRECTION

PATENT NO. : 6,412,401 B1  
DATED : July 2, 2002  
INVENTOR(S) : R. Mariotti

It is certified that error appears in the above-identified patent and that said Letters Patent is hereby corrected as shown below:

<u>Title page,</u>
Item [57], ABSTRACT,
Line 5, "fly" should be -- fry --.

<u>Column 2,</u>
Lines 19 and 25, "flyer" should be -- fryer --.
Line 36, "fly" should be -- fry --.

<u>Column 3,</u>
Line 33, "flying" should be -- frying --.

<u>Column 11,</u>
Line 36, "filing" should be -- filling --.
Line 46, "flyer" should be -- fryer --.

<u>Column 12,</u>
Line 41, "fly" should be -- fry --.
Line 50, before "bowl" insert -- a --.

<u>Column 13,</u>
Line 67, "fly" should be -- fry --.

<u>Column 14,</u>
Line 22, "fly" should be -- fry --.

Signed and Sealed this

Twentieth Day of May, 2003

JAMES E. ROGAN
*Director of the United States Patent and Trademark Office*